(12) United States Patent
Zhang

(10) Patent No.: US 8,736,630 B2
(45) Date of Patent: May 27, 2014

(54) IMAGE PROCESSING DEVICE AND IMAGE PROCESSING METHOD

(75) Inventor: Xiaomang Zhang, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 335 days.

(21) Appl. No.: 13/138,105

(22) PCT Filed: Feb. 8, 2010

(86) PCT No.: PCT/JP2010/051762
§ 371 (c)(1),
(2), (4) Date: Jul. 7, 2011

(87) PCT Pub. No.: WO2010/131499
PCT Pub. Date: Nov. 18, 2010

(65) Prior Publication Data
US 2012/0019519 A1    Jan. 26, 2012

(30) Foreign Application Priority Data

May 15, 2009    (JP) .................................. 2009-118333

(51) Int. Cl.
| | | |
|---|---|---|
| G09G 5/00 | (2006.01) | |
| G09G 5/02 | (2006.01) | |
| G09G 5/36 | (2006.01) | |
| H04N 5/46 | (2006.01) | |
| H04N 9/30 | (2006.01) | |
| G03F 3/08 | (2006.01) | |
| H04N 1/46 | (2006.01) | |
| G06K 9/40 | (2006.01) | |
| G06K 9/36 | (2006.01) | |
| G06K 9/00 | (2006.01) | |

(52) U.S. Cl.
USPC ........... 345/589; 345/591; 345/600; 345/606; 345/643; 345/549; 348/557; 348/791; 358/518; 358/523; 358/525; 382/167; 382/274; 382/276

(58) Field of Classification Search
USPC ................. 345/581, 589–591, 600–603, 606, 345/643–644, 547–549; 348/180, 196, 348/253–254, 263, 552, 557, 560, 577, 612, 348/630, 655, 687, 728, 739, 790–791; 358/504, 515–520, 523–525; 382/162, 382/167, 254, 274, 276, 300
See application file for complete search history.

(56) References Cited

U.S. PATENT DOCUMENTS 5,258,829 A    11/1993  Matsunaga et al.
5,428,720 A  *  6/1995  Adams, Jr. .................... 345/604

(Continued)

FOREIGN PATENT DOCUMENTS

JP    4-291591 A    10/1992
JP    09219800    8/1997

(Continued)

*Primary Examiner* — Wesner Sajous
(74) *Attorney, Agent, or Firm* — Harness, Dickey & Pierce, P.L.C.

(57) ABSTRACT

Provided is an image processing device which enables image display that takes full advantage of a color reproduction performance of a panel without providing a viewer with a feeling of strangeness. In at least one embodiment, an image processing device includes: a first color space converter configured to convert an externally transmitted RGB signal into an XYZ signal; a three-dimensional matching processor configured to perform conversion to tristimulus values of the XYZ signal to generate an XYZ signal; and a second color space converter configured to convert the XYZ signal to an RGB signal for a liquid crystal panel. The three-dimensional matching processor performs the conversion to the tristimulus values such that saturation and brightness of only colors whose chromaticity coordinate is outside a boundary line provided on an xy chromaticity diagram are increased, and maintains the tristimulus values as they are such that colors whose chromaticity coordinate is within the boundary line are displayed in colors accurate to colors represented by the RGB signal.

33 Claims, 11 Drawing Sheets

(56) References Cited

U.S. PATENT DOCUMENTS

| | | | |
|---|---|---|---|
| 6,567,543 B1 | 5/2003 | Shiraiwa et al. | |
| 8,081,819 B2* | 12/2011 | Ohga | 382/167 |
| 2003/0090691 A1* | 5/2003 | Okamoto | 358/1.9 |
| 2005/0018226 A1* | 1/2005 | Chiba | 358/1.9 |
| 2005/0237550 A1* | 10/2005 | Hu | 358/1.9 |
| 2006/0188150 A1* | 8/2006 | Katsumata et al. | 382/162 |
| 2007/0070364 A1* | 3/2007 | Henley | 358/1.9 |
| 2009/0175536 A1* | 7/2009 | Gutta et al. | 382/166 |
| 2009/0278982 A1 | 11/2009 | Imai et al. | |

FOREIGN PATENT DOCUMENTS

| | | |
|---|---|---|
| JP | 10108031 A | 4/1998 |
| JP | 2006086728 A | 3/2006 |
| JP | 2006086924 A | 3/2006 |
| JP | 2008040305 A | 2/2008 |
| JP | 2008078737 A | 4/2008 |
| JP | 2008086029 A | 4/2008 |
| JP | 2009092732 A | 4/2009 |
| WO | WO-2007132635 A1 | 11/2007 |

* cited by examiner

Fig.6

| i | $K_1[i]$ |
|---|---|
| 1 | 0 |
| 2 | 0.221199 |
| 3 | 0.393469 |
| ⋮ | ⋮ |
| 29 | 0.999447 |
| 30 | 0.999569 |
| 31 | 0.999665 |

| | | R (RED) | G (GREEN) | B (BLUE) | W (WHITE) | |
|---|---|---|---|---|---|---|
| HDTV STANDARD (ITU-R BT.709 STANDARD) | x | 0.6400 | 0.3000 | 0.1500 | 0.3127 | ~91 |
| | y | 0.3300 | 0.6000 | 0.0600 | 0.3290 | |
| LIQUID CRYSTAL PANEL (AN EXAMPLE) | x | 0.6496 | 0.2840 | 0.1499 | 0.2744 | ~92 |
| | y | 0.3288 | 0.6324 | 0.0540 | 0.2765 | |

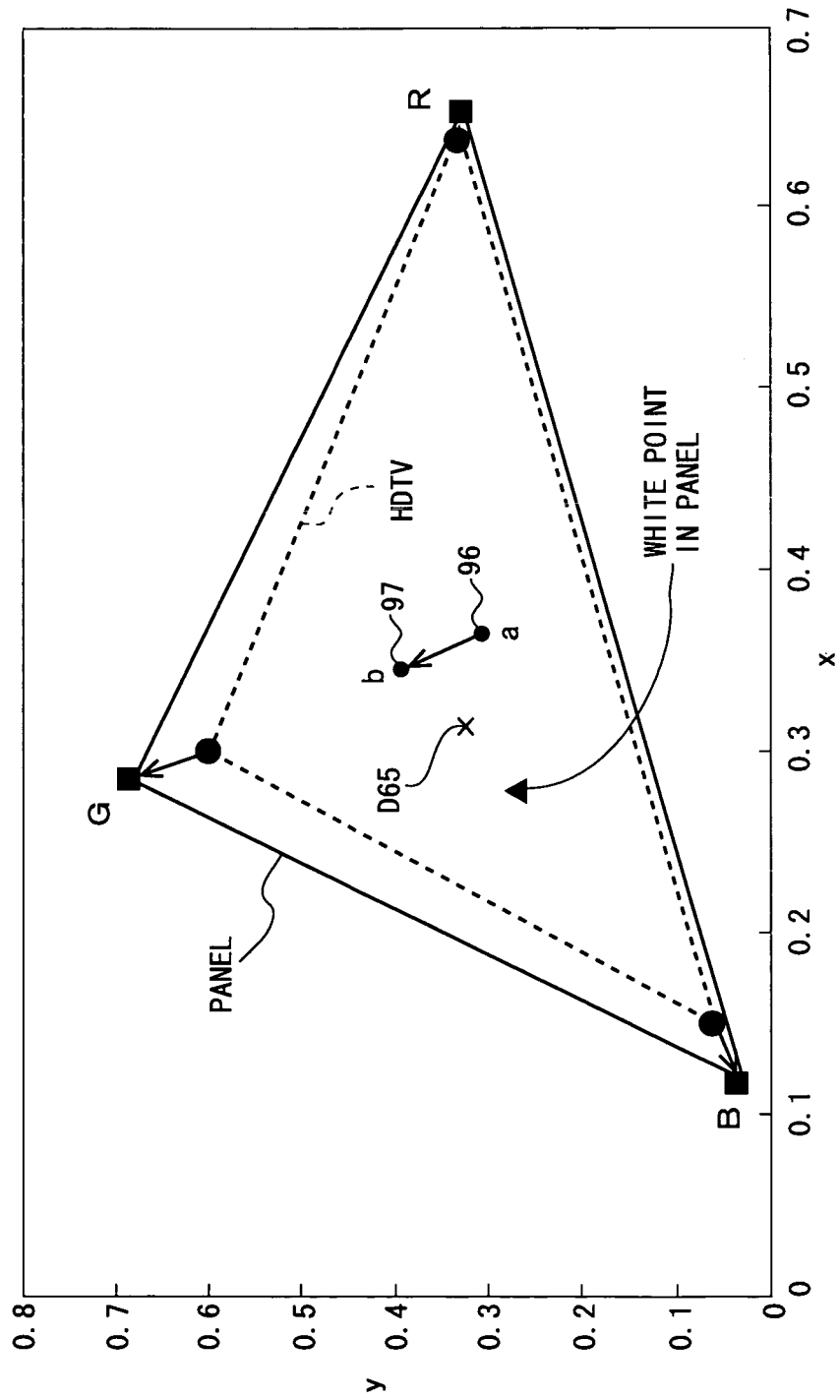

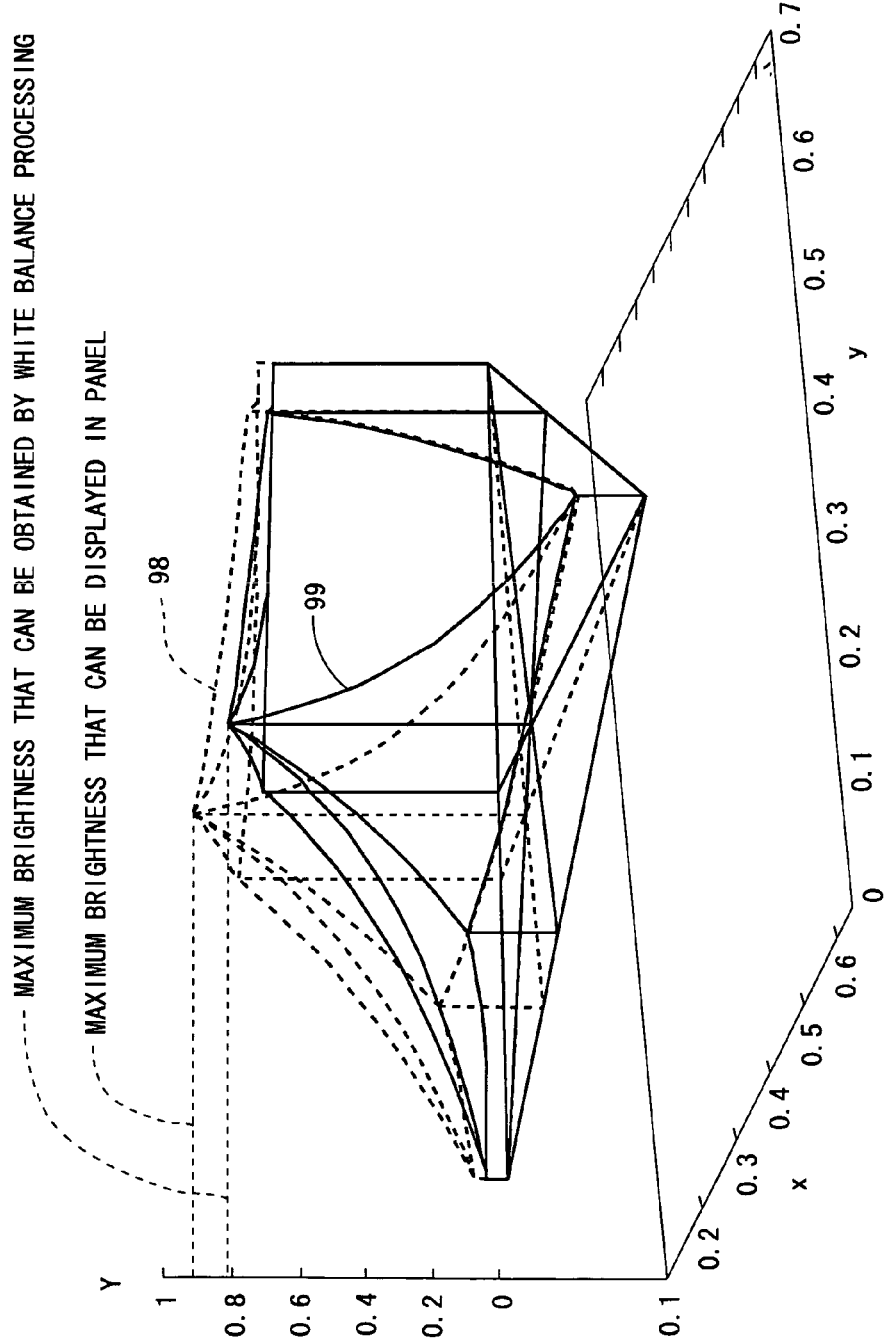

IMAGE PROCESSING DEVICE AND IMAGE PROCESSING METHOD

TECHNICAL FIELD

The present invention relates to an image processing device and an image processing method, and in particular, to a technique of displaying in a way taking full advantage of a color reproduction range of the device.

BACKGROUND ART

In general, a color reproduction range (also referred to as a "color space", a "color gamut", or a "color purity") of display apparatuses, printing apparatuses, image pickup apparatuses, and the like is different by the model. In addition, for color television apparatuses, a color reproduction range of inputted video signals is different by the employed television system. For this reason, conventionally, color conversion processing of a variety of types is performed when generating output data based on inputted data, in order to output colors as accurately as possible to the inputted data regardless of the color reproduction range. For example, when performing HDTV (High Definition Television) broadcasting using a color television apparatus that employs a liquid crystal panel, signals in a standard specified by ITU-R (International Telecommunication Union Radiocommunications Sector) BT.709 (hereinafter referred to as the "HDTV standard") are supplied to the color television apparatus from an external signal source. In this case, the signals supplied to the color television apparatus from the external signal source are RGB signals. In the color television apparatus, mapping (matching) processing of a color gamut of an RGB signal supplied from the signal source to a color gamut in the liquid crystal panel that constitutes the color television apparatus (hereinafter referred to as the "color gamut conversion processing") is performed. Then, by applying a voltage corresponding to a value of each color included in the RGB signal obtained through the color gamut conversion processing to the liquid crystal layer, color is displayed in a display portion of the liquid crystal panel as accurately as possible to color represented by the RGB signal supplied from the signal source. The following describes the color gamut conversion processing performed in the color television apparatus in detail.

FIG. 8 is a table showing chromaticity coordinate values (coordinate values on an xy chromaticity diagram) of primary colors in the HDTV standard and chromaticity coordinate values of primary colors in a liquid crystal panel that constitutes a display apparatus (color television apparatus). Referring to FIG. 8, for example, it can be seen that "the chromaticity coordinate (x, y) for R (red) is (0.6400, 0.3300) in the HDTV standard". In this case, by performing normalization based on information related to the HDTV standard represented by a reference numeral 91 in FIG. 8 such that brightness Y of W (white) in the XYZ color space is 1, a following equation (1) expressing a relation between an RGB value and an XYZ value can be obtained. It should be noted that X, Y, and Z are tristimulus values in an XYZ colorimetric system.

[Equation 1]

$$\begin{pmatrix} X \\ Y \\ Z \end{pmatrix} = \begin{pmatrix} 0.4124, & 0.3576, & 0.1805 \\ 0.2126, & 0.7152, & 0.0722 \\ 0.0193, & 0.1192, & 0.9505 \end{pmatrix} \begin{pmatrix} R \\ G \\ B \end{pmatrix}_{HDTV} \quad (1)$$

Similarly, a following equation (2) expressing a relation between the RGB value and the XYZ value based on information related to the liquid crystal panel represented by a reference numeral 92 in FIG. 8 can be obtained as listed below.

[Equation 2]

$$\begin{pmatrix} X \\ Y \\ Z \end{pmatrix} = \begin{pmatrix} 0.4091, & 0.3101, & 0.2840 \\ 0.2071, & 0.6906, & 0.1023 \\ 0.0136, & 0.0913, & 1.5085 \end{pmatrix} \begin{pmatrix} R \\ G \\ B \end{pmatrix}_{panel} \quad (2)$$

Furthermore, where "right side in the equation (1)=right side in the equation (2)", a following equation (3) can be obtained as listed below.

[Equation 3]

$$\begin{pmatrix} R \\ G \\ B \end{pmatrix}_{panel} = \begin{pmatrix} 1.0002, & 0.1021, & -0.0056 \\ 0.0075, & 1.0024, & 0.0130 \\ 0.0033, & 0.0174, & 0.6294 \end{pmatrix} \begin{pmatrix} R \\ G \\ B \end{pmatrix}_{HDTV} \quad (3)$$

In this case, the equation (3) is to obtain values of the respective RGB colors corresponding to voltage values to be applied to a liquid crystal layer in the liquid crystal panel from the RGB signals in the HDTV standard supplied from the signal source. Specifically, as shown in FIG. 9, an RGB signal $RGB_{in}$ in the HDTV standard is inputted into a display apparatus (color television apparatus) 9 from a signal source 93, and the RGB signal $RGB_{in}$ is converted based on the equation (3) by a color gamut conversion processor 94. Then, an RGB signal $RGB_{out}$ obtained through the conversion processing by the color gamut conversion processor 94 is supplied to a liquid crystal panel 95. In this manner, color accurate to the color represented by the RGB signal $RGB_{in}$ supplied from the signal source 93 is displayed in a display portion of the liquid crystal panel 95.

Further, conventionally, there is known white balance processing for correcting colors such that white color is displayed correctly regardless of a color temperature of a light source. In white balance processing, a value of each color of RGB is multiplied by a predetermined gain so as to suppress a disturbance in the balance among the RGB colors due to a difference between light sources.

It should be noted that, in relation to the present invention, the following prior art references are known. Japanese Unexamined Patent Application Publication No. H04-291591 discloses an invention relating to a color display apparatus capable of reproducing colors of any of inputted video signals having a plurality of different color reproduction ranges from each other without a color reproduction error. Japanese Unexamined Patent Application Publication No. 2008-78737 discloses a technique of preventing a color gamut of an image output device from being unnecessarily wide by correcting brightness or luminance. Japanese Unexamined Patent Application Publication No. 2008-86029 discloses a method of acquiring desired color reproduction by utilizing a standard color space with an extended color gamut.

PRIOR ART DOCUMENTS

Patent Documents

Patent Document 1: Japanese Unexamined Patent Application Publication No. H04-291591

Patent Document 2: Japanese Unexamined Patent Application Publication No. 2008-78737

Patent Document 3: Japanese Unexamined Patent Application Publication No. 2008-86029

SUMMARY OF THE INVENTION

Problems to be Solved by the Invention

In the meantime, the color reproducibility of liquid crystal panels has been remarkably improved in recent years, and liquid crystal panels whose NTSC ratio is about 150% have become realized. A color reproduction range of such a liquid crystal panel is wider than a color reproduction range based on the HDTV standard. For this treason, there is a growing demand for display of an image taking full advantage of a color reproduction performance of such a liquid crystal panel (display of an image utilizing a wider range of colors). However, according to the color gamut conversion processing described above, although it is possible to display colors accurate to colors represented by the inputted video signals, image display using an area that is within the color reproduction range of the panel but out of the color reproduction range of the inputted video signals is not performed. Specifically, image display taking advantage of a color reproduction performance of the panel is not performed. For example, conversion from an RGB signal in the HDTV standard to an RGB signal for the panel is performed based on the equation (3). According to the equation (3), when a value of the RGB signal in the HDTV standard is pure blue (0.0, 0.0, 1.0), a value of the RGB signal for the panel is (0.0, 0.0, 0.6294). Specifically, this means only about 63% of a maximum color reproduction range is used for B (blue). Further, also in the color display apparatus disclosed in Japanese Unexamined Patent Application Publication No. H04-291591 listed above, as can be seen from FIG. 10, image display using a range beyond the color reproduction range based on the HDTV standard is not performed.

Moreover, according to the white balance processing, although white color is accurately displayed, colors other than white are displayed according to properties of the panel, resulting in that color deviation in memory colors such as in specific flesh color provides a viewer with a feeling of strangeness. This issue will be described with reference to FIG. 11. In the white balance processing, by multiplying each color value of an RGB signal based on the HDTV standard by a predetermined gain, D65 (reference white color) is correctly displayed in the panel regardless of the difference between a chromaticity coordinate of a white point in the panel and a chromaticity coordinate of D65. However, in an example shown in FIG. 11, along with changes in chromaticity coordinates of G (green) and B (blue), for example, color having a chromaticity coordinate at an a-point represented by a reference numeral 96 based on the HDTV standard is displayed as color having a chromaticity coordinate at a b-point represented by a reference numeral 97 in the panel. Thus, color other than white color is not displayed accurately to color represented by the inputted video signal. Further, FIG. 12 schematically shows an xyY color space (reference numeral 98) of the panel and an xyY color space (reference numeral 99) obtained by the white balance processing. Referring to FIG. 12, focusing on brightness Y, it can be seen that maximum brightness that can be displayed in the panel is higher than maximum brightness obtained by the white balance processing. Specifically, display of the brightness in a way taking full advantage of the panel is not performed by the white balance processing.

Furthermore, while it is possible to take advantage of a color reproduction performance of the panel when color values of the respective RGB signals based on the HDTV standard are supplied to the panel as they are, color different from color represented by the inputted video signal is displayed, resulting in that color deviation in memory colors such as in specific flesh color provides the viewer with a feeling of strangeness.

Therefore, an object of the present invention is to provide an image processing device which enables image display that takes full advantage of a color reproduction performance of a panel without providing a viewer with a feeling of strangeness.

Means For Solving the Problems

A first aspect of the present invention is directed to an image processing device, comprising:

a first color space converter configured to convert externally supplied image data in an RGB colorimetric system into first XYZ data which is image data in an XYZ colorimetric system;

an XYZ data converter configured to generate second XYZ data which is image data in the XYZ colorimetric system by performing predetermined conversion processing to values of X, Y, and Z as tristimulus values that constitute the first XYZ data; and a second color space converter configured to convert the second XYZ data into image data in the RGB colorimetric system.

According to a second aspect of the present invention, in the first aspect of the present invention, the XYZ data converter performs the conversion processing to the values of X, Y, and Z such that a color reproduction range obtained by the second XYZ data is wider than a color reproduction range obtained by the first XYZ data.

According to a third aspect of the present invention, in the second aspect of the present invention, when performing the conversion processing to data of each pixel included in the first XYZ data, on an xy chromaticity diagram, the XYZ data converter obtains a first coordinate, a second coordinate, and a third coordinate, the first coordinate being a chromaticity coordinate for data of the corresponding pixel, the second coordinate being a chromaticity coordinate of an intersection point between a straight line for conversion and a line defining the color reproduction range obtained by the first XYZ data, the third coordinate being a chromaticity coordinate of an intersection point between the straight line for conversion and a line defining the color reproduction range obtained by the second XYZ data, the straight line for conversion passing through a predetermined reference coordinate and the first coordinate, and obtains a value of a fourth coordinate such that a proportion of a distance between the reference coordinate and the first coordinate to a distance between the reference coordinate and the second coordinate becomes equal to a proportion of a distance between the reference coordinate and the fourth coordinate to a distance between the reference coordinate and the third coordinate and the fourth coordinate corresponds to a chromaticity coordinate on the straight line for conversion when a chromaticity coordinate for data after the conversion processing to the data of the corresponding pixel is defined as the fourth coordinate.

According to a fourth aspect of the present invention, in the second aspect of the present invention, when performing the conversion processing to data of each pixel included in the first XYZ data, on an xy chromaticity diagram, the XYZ data converter obtains a first coordinate, a second coordinate, and a third coordinate, the first coordinate being a chromaticity coordinate for data of the corresponding pixel, the second coordinate being a chromaticity coordinate of an intersection point between a straight line for conversion and a line defining the color reproduction range obtained by the first XYZ data, the third coordinate being a chromaticity coordinate of an intersection point between the straight line for conversion and a line defining the color reproduction range obtained by the second XYZ data, the straight line for conversion passing through a predetermined reference coordinate and the first coordinate, and takes, as a fourth coordinate, a chromaticity coordinate of a point that is on the straight line for conversion and closer to the third coordinate from the reference coordinate by a distance obtained by multiplying a first factor by a distance between the reference coordinate and the third coordinate when a chromaticity coordinate for data after the conversion processing to the data of the corresponding pixel is defined as the fourth coordinate, the first factor being represented by a function of a basic factor obtained by dividing a distance between the reference coordinate and the first coordinate by a distance between the reference coordinate and the second coordinate.

According to a fifth aspect of the present invention, in the fourth aspect of the present invention, the XYZ data converter obtains the first factor by an equation:

$$k_1 = 1 - e^{-k\lambda}$$

wherein, $k_1$ is the first factor, k is the basic factor, e is a base of natural logarithm, and $\lambda$ is a positive factor that is determinable to be any value.

According to a sixth aspect of the present invention, in the fourth aspect of the present invention, the image processing device further comprises a first look-up table that previously stores a plurality of values of the first factor each in association with a predetermined index, wherein the XYZ data converter acquires a value of the first factor from the first look-up table by using an index obtained based on the basic factor.

According to a seventh aspect of the present invention, in the third aspect of the present invention, the XYZ data converter obtains, when performing the conversion processing to data of each pixel included in the first XYZ data, a value of brightness for data of each pixel to be included in the second XYZ data such that a proportion of a maximum value of brightness at the fourth coordinate to a maximum value of brightness at the first coordinate becomes equal to a proportion of brightness for data after the conversion processing is performed to the data of the corresponding pixel included in the first XYZ data to brightness for the data of the corresponding pixel included in the first XYZ data.

According to an eighth aspect of the present invention, in the fourth aspect of the present invention, the XYZ data converter obtains, when performing the conversion processing to data of each pixel included in the first XYZ data, a value of brightness for data of each pixel to be included in the second XYZ data by using a second factor represented by a function of the basic factor and based on an equation:

$$Y_1 = ((1-k_2) + (Y_a \times k_2)) \times Y$$

wherein, $Y_1$ is the brightness for the data of the corresponding pixel to be included in the second XYZ data, Y is the brightness for the data of the corresponding pixel included in the first XYZ data, $k_2$ is the second factor, and $Y^a$ is a value obtained by dividing a maximum value of brightness at the fourth coordinate by a maximum value of brightness at the first coordinate.

According to a ninth aspect of the present invention, in the eighth aspect of the present invention, the XYZ data converter obtains the second factor based on an equation:

$$k_2 = 1 - e^{-k\gamma}$$

wherein, $k_2$ is the second factor, k is the basic factor, e is a base of natural logarithm, and $\gamma$ is a positive factor that is determinable to be any value.

According to a tenth aspect of the present invention, in the eighth aspect of the present invention, the image processing device further comprises a second look-up table that previously stores a plurality of values of the second factor each in association with a predetermined index, wherein the XYZ data converter acquires a value of the second factor from the second look-up table by using an index obtained based on the basic factor.

According to an eleventh aspect of the present invention, in the third aspect of the present invention, on the xy chromaticity diagram, the XYZ data converter takes, as the reference coordinate, a chromaticity coordinate of an intersection point between a boundary line and the straight line for conversion, and performs the conversion processing to data of each pixel included in the first XYZ data only when the first coordinate is outside the boundary line, the boundary line including at least three points and defining a closed region.

According to a twelfth aspect of the present invention, in the eleventh aspect of the present invention, the boundary line is defined so as to include therein a chromaticity coordinate for D65 which is a standard light source.

According to a thirteenth aspect of the present invention, in the eleventh aspect of the present invention, the boundary line is defined so as to include therein chromaticity coordinates of memory color including at least white color and flesh color.

A fourteenth aspect of the present invention is directed to a display apparatus having a display panel to display an image, the display apparatus comprises the image processing device according to any one of the first through the thirteenth aspects of the present invention, wherein the display panel displays the image based on data in an RGB colorimetric system generated by the second color space converter.

A fifteenth aspect of the present invention is directed to an image processing method, comprising:

a first color space converting step of converting image data in an RGB colorimetric system into first XYZ data which is image data in an XYZ colorimetric system;

an XYZ data converting step of generating second XYZ data which is image data in the XYZ colorimetric system by performing predetermined conversion processing to values of X, Y, and Z as tristimulus values that constitute the first XYZ data; and a second color space converting step of converting the second XYZ data into image data in the RGB colorimetric system.

In addition, variants that are grasped by referring to the embodiment and the drawings in the fifteenth aspect of the present invention are considered to be means for solving the problems.

Effects of the Invention

According to the first aspect of the present invention, the image data in the RGB colorimetric system supplied from the external of the image processing device (hereinafter referred to as "RGB data") is converted into the image data in the XYZ colorimetric system (hereinafter referred to as "XYZ data"), and the conversion processing is performed to tristimulus values X, Y, and Z of the XYZ data. In this case, in the XYZ colorimetric system unlike the RGB colorimetric system, the tristimulus values do not take negative values, and the tristimulus values in the XYZ colorimetric system are independent of a device. Therefore, when it is desired to display color different from color represented by the externally supplied RGB data in an output device (for example, a liquid crystal panel), it is possible to facilitate data conversion processing without requiring complicated arithmetic processing as compared to conversion processing to the data in the RGB colorimetric system.

According to the second aspect of the present invention, the color reproduction range obtained by the data after the conversion processing is wider than the color reproduction range obtained by the data before the conversion processing. Therefore, it is possible to perform image display taking advantage of color reproduction performance of the output device, even when the color reproduction range obtained by the inputted data (externally supplied RGB data) is narrower than the color reproduction range of the output device.

According to the third aspect of the present invention, on the xy chromaticity diagram, saturation of data of each pixel included in the inputted data is increased while considering a relation between the color reproduction range obtained by the inputted data and the color reproduction range of the output device. Therefore, it is possible to perform image display using colors of a range wider than the color reproduction range obtained by the inputted data without disturbing a color balance of an entire image on the xy chromaticity diagram.

According to the fourth aspect of the present invention, on the xy chromaticity diagram, saturation of data of each pixel included in the inputted data is increased while considering a relation between the color reproduction range obtained by the inputted data and the color reproduction range of the output device. At this time, the chromaticity coordinate of the data after the conversion processing is obtained using the first factor which is the function of the factor (basic factor) determined according to the chromaticity coordinate for the data of the corresponding pixel included in the inputted data. Therefore, by employing the configuration in which the first factor is obtained considering human visual features, it is possible to perform image display using colors of a range wider than the color reproduction range obtained by the inputted data without providing a viewer of an image with a feeling of strangeness.

According to the fifth aspect of the present invention, by setting $\lambda$ to be an appropriate value, it is possible to perform image display using colors of a range wider than the color reproduction range obtained by the inputted data without providing a viewer of an image with a feeling of strangeness.

According to the sixth aspect of the present invention, as the first factor used for data conversion processing is acquired from the look-up table, the arithmetic processing for obtaining the first factor is not necessary, and thus the implementation is facilitated.

According to the seventh aspect of the present invention, brightness for the data after the conversion processing is obtained while considering a relation between maximum brightness at the chromaticity coordinate of the inputted data and maximum brightness at the chromaticity coordinate of the data after the conversion processing. Therefore, it is possible to perform image display using colors of brightness higher than maximum brightness obtained by the inputted data without disturbing a brightness balance of an entire image in the xyY space.

According to the eighth aspect of the present invention, brightness for the data after the conversion processing is obtained while considering a relation between maximum brightness at the chromaticity coordinate of the inputted data and maximum brightness at the chromaticity coordinate of the data after the conversion processing. At this time, the second factor which is the function of the factor (basic factor) determined according to the chromaticity coordinate of the corresponding pixel included in the inputted data is used. Therefore, by employing the configuration in which the second factor is obtained considering human visual features, it is possible to perform image display using colors of brightness higher than maximum brightness obtained by the inputted data without providing a viewer of an image with a feeling of strangeness.

According to the ninth aspect of the present invention, by setting $\gamma$ to be an appropriate value, it is possible to perform image display using colors of brightness higher than maximum brightness obtained by the inputted data without providing a viewer of an image with a feeling of strangeness.

According to the tenth aspect of the present invention, as the second factor used for data conversion processing is acquired from the look-up table, the arithmetic processing for obtaining the second factor is not necessary, and thus the implementation is facilitated.

According to the eleventh aspect of the present invention, as for colors whose chromaticity coordinate is outside the boundary line on the xy chromaticity diagram, conversion processing is performed to the tristimulus values X, Y, and Z in the XYZ colorimetric system such that saturation is increased after the conversion processing, and colors after the conversion processing are displayed in the output device. Further, as for colors whose chromaticity coordinate is within the boundary line, conversion processing is not performed to the tristimulus values X, Y, and Z, and colors accurate to colors represented by the inputted data are displayed in the output device. Therefore, by employing the configuration in which the boundary line is defined considering human visual features and the like, it is possible to perform image display taking full advantage of the color reproduction performance of the output device without providing a viewer of an image with a feeling of strangeness.

According to the twelfth aspect of the present invention, as for data of D65 which is the reference light source, the conversion processing by the XYZ data converter is not performed. Therefore, an accurate display is performed for the reference white color accurately. With this, it is possible to prevent a viewer of an image from having a feeling of strangeness due to the conversion processing performed to color data.

According to the thirteenth aspect of the present invention, as for data of memory colors, the conversion processing by the XYZ data converter is not performed. Therefore, colors accurate to colors represented by the inputted data are displayed for memory colors. With this, it is possible to perform image display taking full advantage of the color reproduction performance of the output device without providing a viewer with a feeling of strangeness.

According to the fourteenth aspect of the present invention, there is realized a display apparatus including the image processing device providing the same effect as that of any of the first to the thirteenth aspects of the present invention.

BRIEF DESCRIPTION OF THE DRAWINGS

FIG. 6 is a table illustrating one example of a look-up table in a modified example according to the embodiment.

FIG. 11 is an xy chromaticity diagram for describing white balance processing.

FIG. 12 is a diagram for describing a difference between an xyY space of the panel and an xyY space obtained by white balance processing.

MODE FOR CARRYING OUT THE INVENTION

One embodiment of the present invention will now be described with reference to the accompanying drawings.

1. General Description of Processing

First, an approach for image processing according to this embodiment will be described. In this embodiment, when conversion from externally supplied RGB data (image data in an RGB colorimetric system) into RGB data for a liquid crystal panel is performed, the RGB data is converted into XYZ data (image data in an XYZ colorimetric system), and conversion processing is performed to tristimulus values X, Y, and Z of the XYZ data. Further, when the conversion processing to the tristimulus values X, Y, and Z is performed, an xyY color space is used. A general description of the image processing according to this embodiment using the xyY color space is described below.

Figure 2:
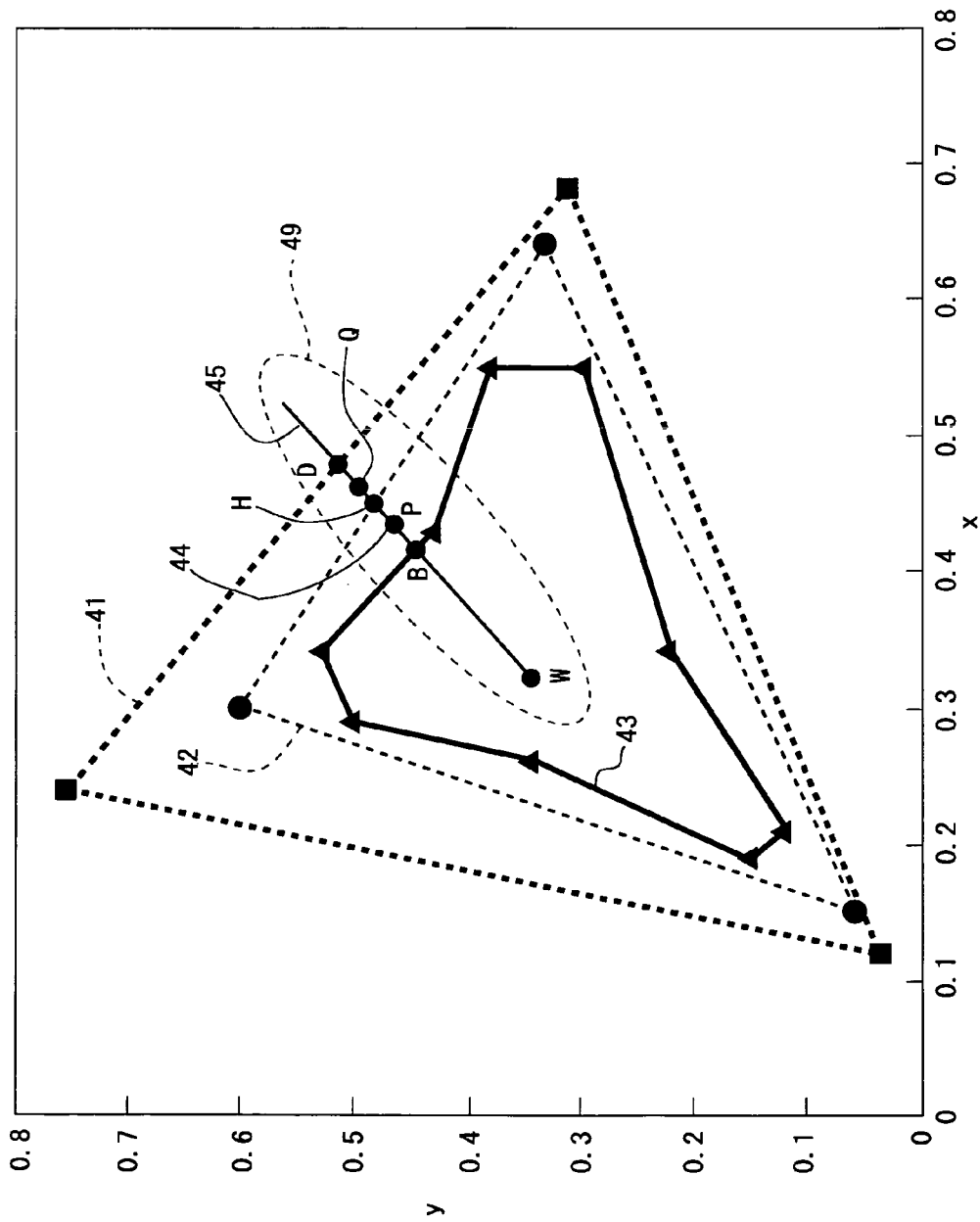
FIG. 2 is an xy chromaticity diagram for describing an outline of image processing according to the embodiment.

FIG. 2 is an xy chromaticity diagram for describing an outline of the image processing according to this embodiment. In FIG. 2, a heavy dotted line represented by a reference numeral 41 indicates (an outline of) a color reproduction range of the liquid crystal panel used in this embodiment, and a fine dotted line represented by a reference numeral 42 indicates (an outline of) a color reproduction range based on the HDTV standard. As can be seen from FIG. 2, the color reproduction range 41 of the liquid crystal panel is wider than the color reproduction range 42 based on the HDTV standard. In this case, according to this embodiment, as shown in FIG. 2, a boundary line such as a heavy solid line represented by a reference numeral 43 is virtually provided on the xy chromaticity diagram. It should be noted that the boundary line 43 passes at least three points, defining a closed region. In the example shown in FIG. 2, the boundary line 43 is configured as an enneagon. Accordingly, as equations representing the boundary line 43, equations that express nine line segments are previously defined.

The boundary line 43 is typically provided so as to include memory colors and D65 (reference white color) inside (the boundary line). Then, colors whose chromaticity coordinate is within the boundary line 43 are displayed in colors accurate to colors represented by inputted video signals. By contrast, as for colors whose chromaticity coordinate is outside the boundary line 43, saturation and brightness are increased, and image display taking full advantage of color reproduction performance of the liquid crystal panel is performed. In order to realize such image display, for colors whose chromaticity coordinate is outside the boundary line 43, conversion to a value of brightness Y as well as conversion to a value of a chromaticity coordinate (x, y) are performed.

For example, when a chromaticity coordinate (x, y) of the color of a pixel (hereinafter referred to as a "target pixel") included in an inputted video signal on the xy chromaticity diagram is a point P represented by a reference numeral 44 in FIG. 2, the color of the target pixel is subjected to conversion as described below. First, an equation for a straight line 45 passing through a white point (referred to as a "point W") (D65 white point is taken as the white point when the inputted video signal is in the HDTV standard) and the point P is obtained. Then, chromaticity coordinates are obtained respectively for an intersection point between the straight line 45 and the outline of the color reproduction range 41 of the liquid crystal panel ("point D"), an intersection point between the straight line 45 and the outline of the color reproduction range 42 based on the HDTV standard ("point H"), and an intersection point between the straight line 45 and the boundary line 43 ("point B"). Then, a chromaticity coordinate of a point Q at which "a proportion of a length of a line segment BP to a length of a line segment BH" and "a proportion of a length of a line segment BQ to a length of a line segment BD" become equal is obtained from chromaticity coordinates on the straight line 45. The chromaticity coordinate of the point Q thus obtained is taken as a chromaticity coordinate of the color of the target pixel after the conversion. Further, brightness of data after the conversion in the xyY space is obtained such that "a proportion of a maximum value of brightness at the point Q to a maximum value of brightness at the point P" and "a proportion of the brightness of the data after the conversion to brightness represented by the inputted video signal" become equal. As described above, when the chromaticity coordinate (x, y) of the color of the target pixel on the xy chromaticity diagram is outside the boundary line 43, the value of this chromaticity coordinate (x, y) and the value of the brightness Y are converted. The following describes this embodiment in detail.

2. Configuration of Display Apparatus and General Description of Operation

Figure 1:
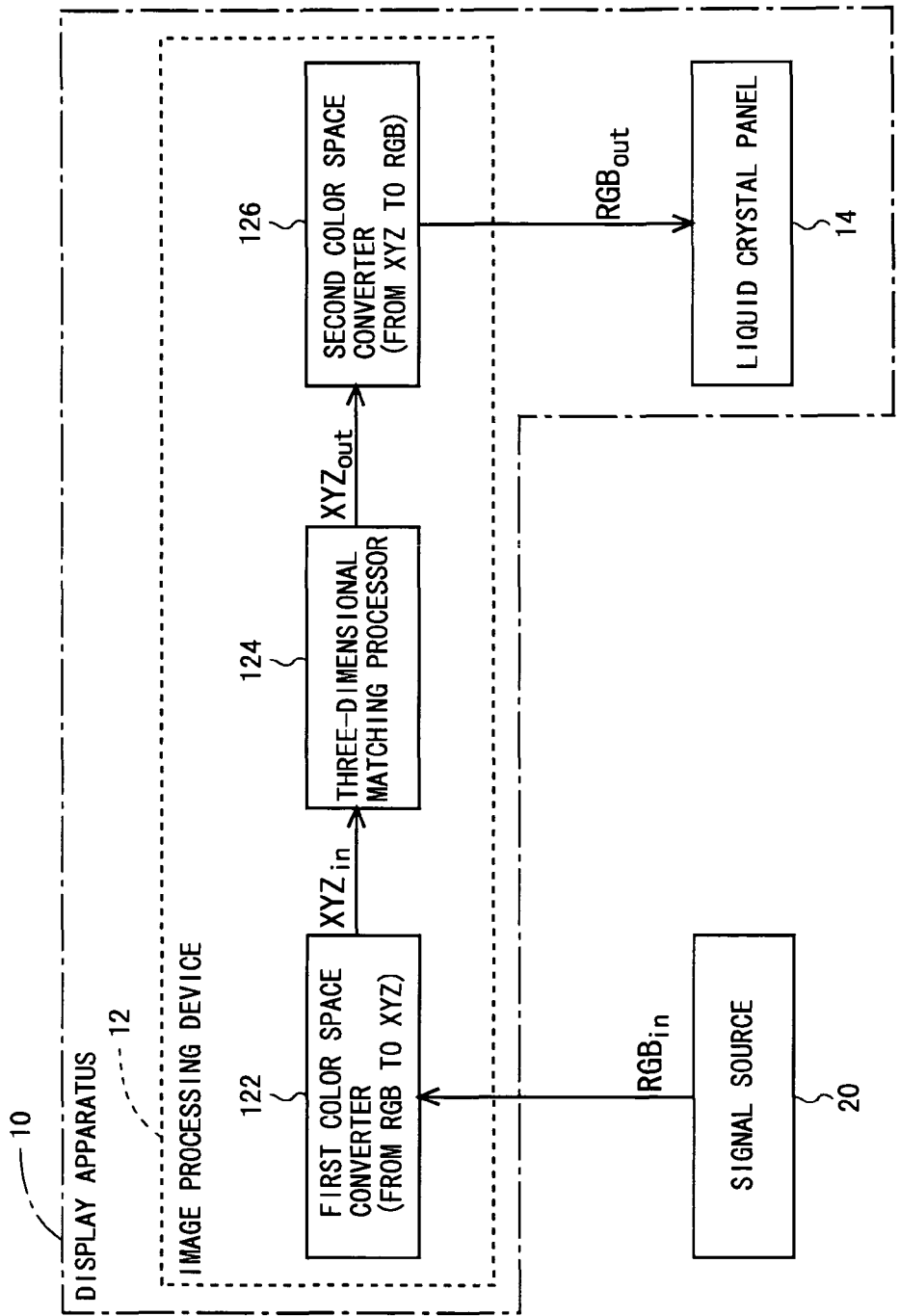
FIG. 1 is a block diagram illustrating a schematic configuration of a display device according to one embodiment of the present invention.
Figures 8, 9:
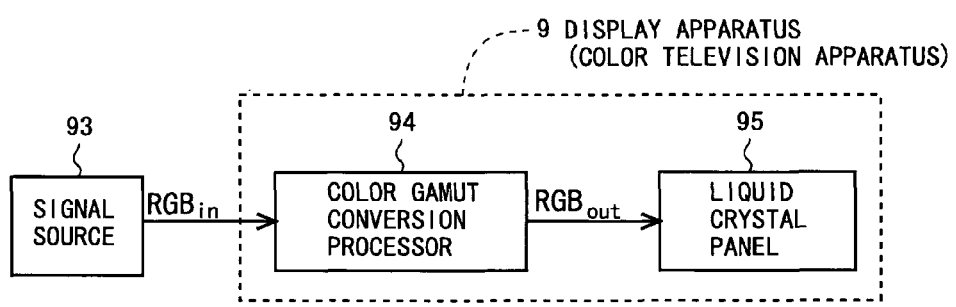
FIG. 8 is a table showing chromaticity coordinate values of primary colors in the HDTV standard and chromaticity coordinate values of primary colors in a liquid crystal panel that constitutes a display apparatus (color television apparatus).
FIG. 9 is a block diagram illustrating an example of a configuration of a display apparatus according to the conventional example.
Figure 10:
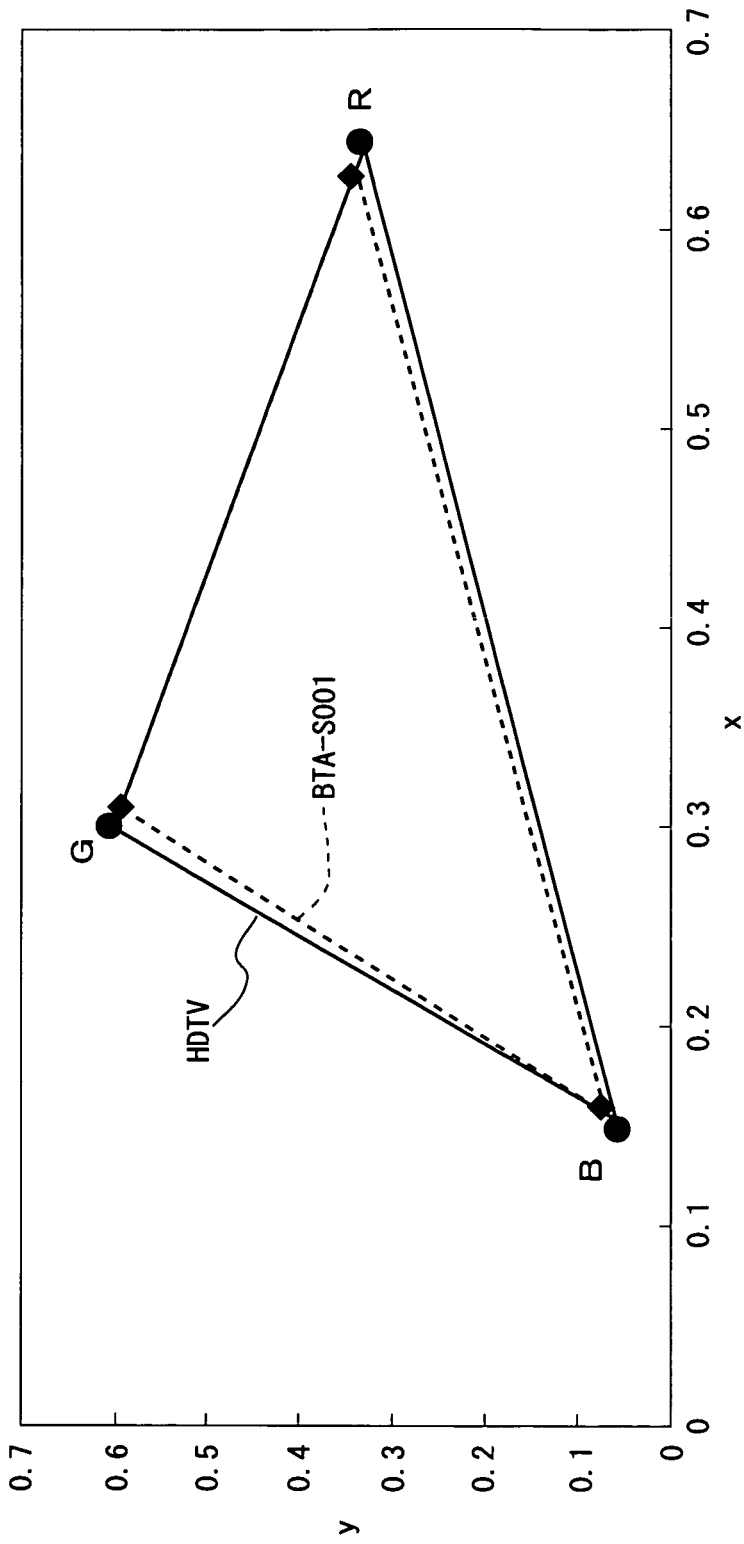
FIG. 10 is an xy chromaticity diagram for describing the conventional example.

FIG. 1 is a block diagram illustrating a schematic configuration of a display device according to the embodiment of the present invention. As shown in FIG. 1, a display device 10 is configured by an image processing device 12 and a liquid crystal panel 14. The image processing device 12 serves to convert an RGB signal $RGB_{in}$ in the HDTV standard supplied from an external signal source 20 into an RGB signal $RGB_{out}$ for the liquid crystal panel 14. The liquid crystal panel 14 displays an image in a display portion (not illustrated) by applying a voltage based on the RGB signal $RGB_{out}$ supplied from the image processing device 12 to a liquid crystal layer. Note that it is assumed that a chromaticity coordinate value of primary color of the liquid crystal panel 14 used in this embodiment is as represented by a reference numeral 92 in FIG. 8.

The image processing device 12 includes, as shown in FIG. 1, a first color space converter 122, a three-dimensional matching processor 124, and a second color space converter 126. The first color space converter 122 converts the RGB signal $RGB_{in}$ in the HDTV standard transmitted from the external signal source 20 into an XYZ signal $XYZ_{in}$ as first XYZ data based on the equation (1). Specifically, in the first color space converter 122, data conversion from an RGB color space to an XYZ color space is performed. The XYZ signal $XYZ_{in}$ obtained through the conversion processing by the first color space converter 122 is supplied to the three-dimensional matching processor 124. The three-dimensional matching processor 124 performs predetermined conversion processing to the XYZ signal $XYZ_{in}$ to generate an XYZ signal $XYZ_{out}$ as second XYZ data to be supplied to the second color space converter 126. It should be noted that the substance of the processing in the three-dimensional matching processor 124 will be later described in detail. The second color space converter 126 converts the XYZ signal $XYZ_{out}$ into an RGB signal $RGB_{out}$ for the liquid crystal panel 14 based on a following equation (4) obtained by the equation (2). Specifically, in the second color space converter 126, data conversion from the XYZ color space to the RGB color space is performed.

[Equation 4]

$$\begin{pmatrix} R \\ G \\ B \end{pmatrix} = \begin{pmatrix} 3.1419, & -1.3448, & -0.5004 \\ -0.9463, & 1.8661, & 0.0516 \\ 0.0289, & -0.1008, & 0.6643 \end{pmatrix} \begin{pmatrix} X \\ Y \\ Z \end{pmatrix} \quad (4)$$

It should be noted that, in the following description, data in the xyY colorimetric system corresponding to the XYZ signal $XYZ_{in}$ inputted into the three-dimensional matching processor 124 is represented by reference symbols x, y, and Y, and data in the xyY colorimetric system corresponding to the XYZ signal $XYZ_{out}$ outputted from the three-dimensional matching processor 124 is represented by reference symbols $x_1$, $y_1$, and $Y_1$.

3. Substance of the Processing in Three-Dimensional Matching Processor

Figure 3:
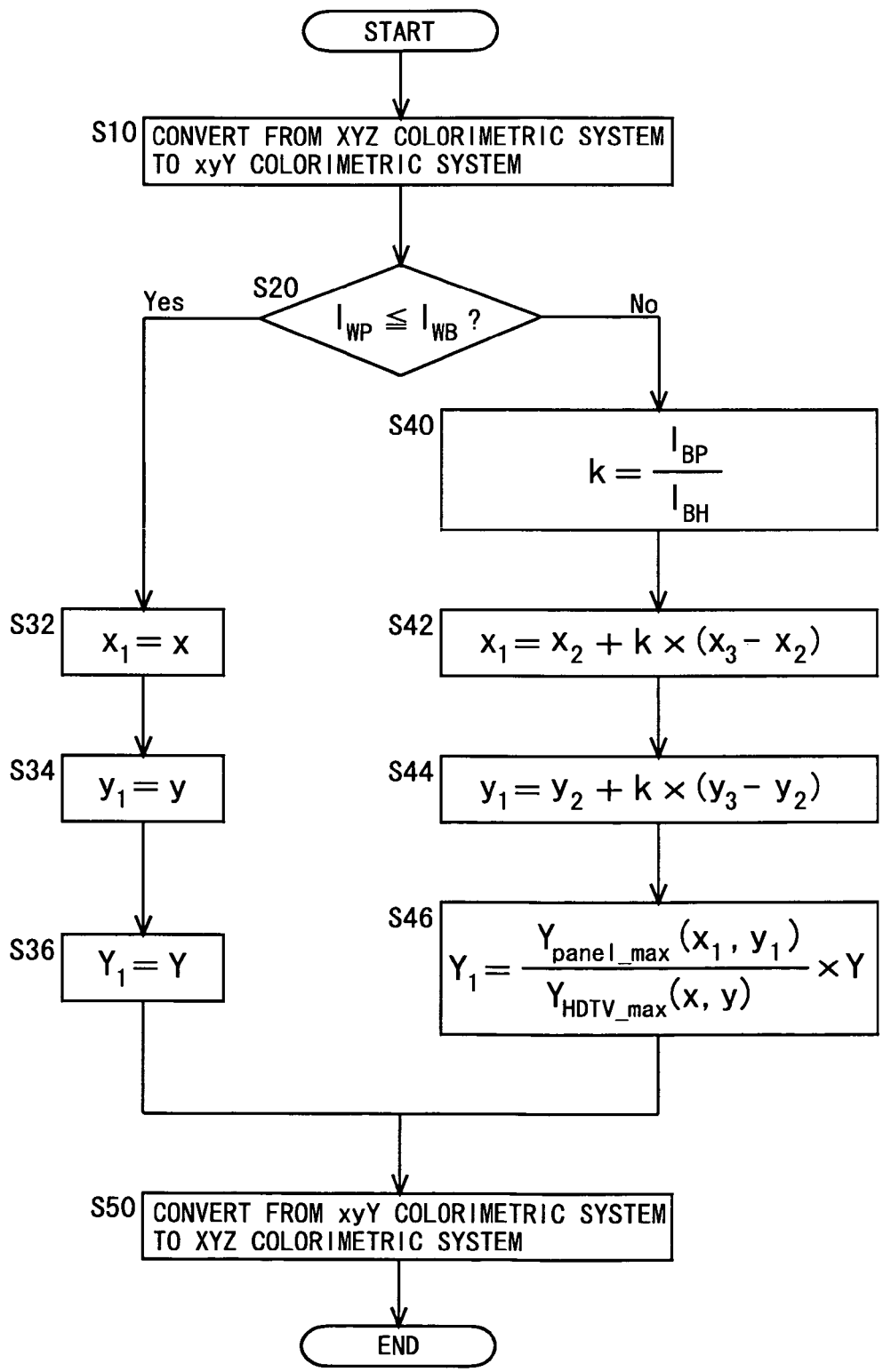
FIG. 3 is a flowchart showing a sequence of conversion processing performed by a three-dimensional matching processor according to the embodiment.
Figure 4:
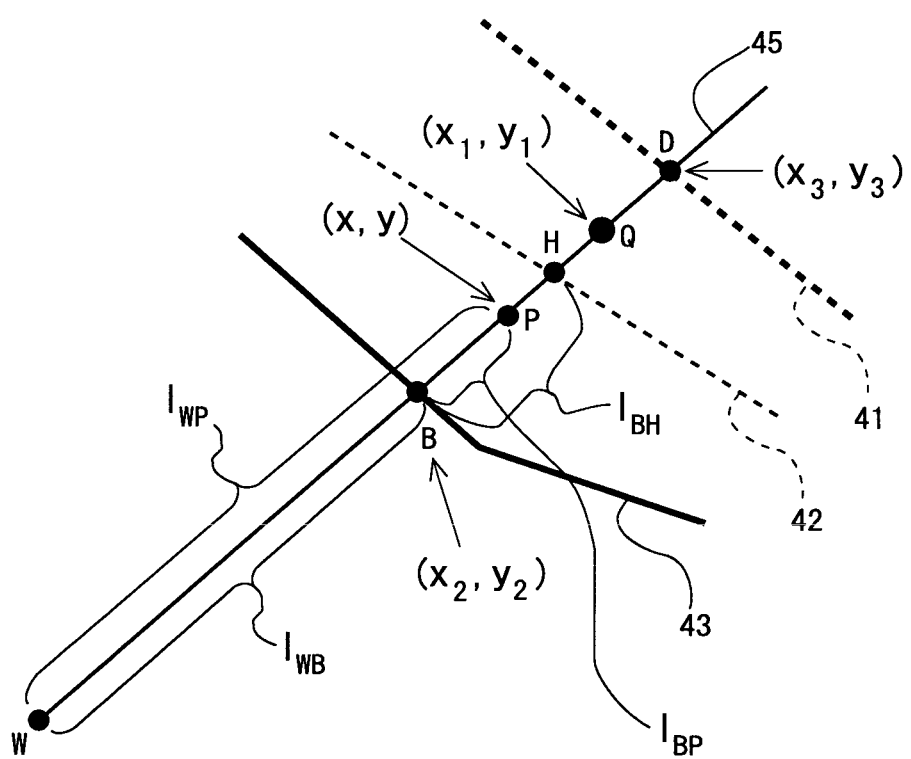
FIG. 4 is an enlarged view of a region represented by a reference numeral 49 in FIG. 2.
Figure 5:
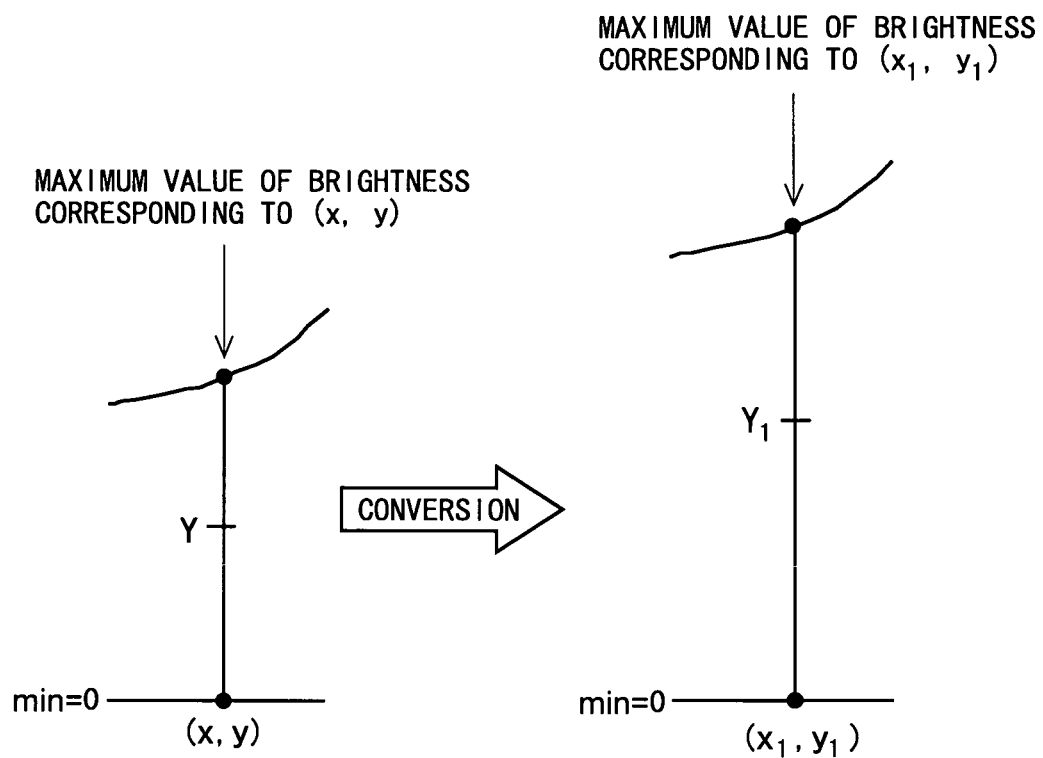
FIG. 5 is a diagram for describing a brightness conversion according to the embodiment.

Next, the substance of the processing in the three-dimensional matching processor 124 is described with reference to FIG. 3 through FIG. 5. FIG. 3 is a flowchart showing a sequence of the conversion processing performed by the three-dimensional matching processor 124. It should be noted that FIG. 3 shows a process sequence of the conversion processing when focusing on a single pixel (target pixel) included in the inputted video signal. FIG. 4 is an enlarged view of a region represented by a reference numeral 49 in FIG. 2. FIG. 5 is a diagram for describing a conversion, in the xyY space, of the brightness Y of the color of the target pixel.

First, the three-dimensional matching processor 124 receives the XYZ signal $XYZ_{in}$ obtained through the conversion processing by the first color space converter 122, and performs data conversion from the XYZ colorimetric system to the xyY colorimetric system (step S10 in FIG. 3). The conversion from the XYZ colorimetric system to the xyY colorimetric system is performed based on following equations (5) and (6).

$$x = X/(X+Y+Z) \quad (5)$$

$$y = Y/(X+Y+Z) \quad (6)$$

As for the brightness Y, the value of Y in the XYZ colorimetric system is taken without any change as the value of Y in the xyY colorimetric system. In this manner, the value of the chromaticity coordinate (x, y) on the xy chromaticity diagram and the value of the brightness Y are obtained for the target pixel. It should be noted that the chromaticity coordinate point of the color of the target pixel on the xy chromaticity diagram (hereinafter referred to as an "input data chromaticity coordinate point") is taken as the point P shown in FIG. 4. However, the point P can be present within the boundary line 43 (closer to the point W).

Next, the three-dimensional matching processor 124 obtains a length $l_{WP}$ of a line segment WP and a length $l_{WB}$ of a line segment WB, and determines whether or not $l_{WP}$ is not greater than $l_{WB}$ (step S20). To be more specific, the three-dimensional matching processor 124 first obtains the equation for the straight line 45 passing through the white point (point W) and the point P. Then, the three-dimensional matching processor 124 obtains the chromaticity coordinates respectively for the intersection point between the straight line 45 and the outline of the color reproduction range 41 of the liquid crystal panel 14 (point D), the intersection point between the straight line 45 and the outline of the color reproduction range 42 based on the HDTV standard (point H), and the intersection point between the straight line 45 and the boundary line 43 (point B). It should be noted that, in the following description, as shown in FIG. 4, the chromaticity coordinate of the point D is represented by $(x_3, y_3)$, the chromaticity coordinate of the point B is represented by $(x_2, y_2)$, and the chromaticity coordinate of the point Q to be obtained by the conversion is represented by $(x_1, y_1)$. Further, the three-dimensional matching processor 124 obtains the length $l_{WP}$ of the line segment WP based on the chromaticity coordinate of the point W and the chromaticity coordinate of the point P, and obtains the length $l_{WB}$ of the line segment WB based on the chromaticity coordinate of the point W and the chromaticity coordinate of the point B. Based on $l_{WP}$ and $l_{WB}$ thus obtained, the three-dimensional matching processor 124 determines whether or not $l_{WP}$ is not greater than $l_{WB}$. As a result of the determination, if $l_{WP}$ is not greater than $l_{WB}$, the process proceeds to step S32, and if $l_{WP}$ is greater than $l_{WB}$, the process proceeds to step S40. It should be noted that, in this embodiment, the chromaticity coordinate of the point B is a reference coordinate, the chromaticity coordinate of the point P is a first coordinate, the chromaticity coordinate of the point H is a second coordinate, the chromaticity coordinate of the point D is a third coordinate, and the chromaticity coordinate of the point Q is a fourth coordinate.

In step S32, the three-dimensional matching processor 124 sets the value of $x_1$ to be x. In step S34, the three-dimensional matching processor 124 sets the value of $y_1$ to be y. In step S36, the three-dimensional matching processor 124 sets the value of $Y_1$ to be Y. After completing step S36, the process proceeds to step S50. As described above, when it is determined that $l_{WP}$ is not greater than $l_{WB}$ in step S20, in other words, when the input data chromaticity coordinate point is within the boundary line 43, conversion is not performed to data values in the xyY space.

In step S40, the three-dimensional matching processor 124 obtains a ratio of a length of a line segment BP to a length of a line segment BH as a factor k (basic factor) for being used in a step that will be described later. To be more specific, the three-dimensional matching processor 124 obtains a length $l_{BH}$ of the line segment BH based on the chromaticity coordinate of the point B and the chromaticity coordinates of the point H, and obtains a length $l_{BP}$ of the line segment BP based on the chromaticity coordinate of the point B and the chromaticity coordinates of the point P. Then, the three-dimensional matching processor 124 obtains the factor k by dividing $l_{BP}$ by $l_{BH}$, as shown by a following equation (7).

$$k = l_{BP}/l_{BH} \quad (7)$$

In step S42, the three-dimensional matching processor 124 obtains the value of $x_1$ based on a following equation (8).

$$x_1 = x_2 + k \times (x_3 - x_2) \quad (8)$$

In step S44, the three-dimensional matching processor 124 obtains the value of $y_1$ based on a following equation (9).

$$y_1 = y_2 + k \times (y_3 - y_2) \quad (9)$$

In step S46, the three-dimensional matching processor 124 obtains the value of $Y_1$ based on a following equation (10). It should be noted that, $Y_{HDTV\_max}(x, y)$ is a maximum value of brightness at a chromaticity coordinate (x, y), and $Y_{panel\_max}(x_1, y_1)$ is a maximum value of brightness at a chromaticity coordinate $(x_1, Y_i)$.

[Equation 5]

$$Y_1 = \frac{Y_{panel\_max}(x_1, y_1)}{Y_{HDTV\_max}(x, y)} \times Y \quad (10)$$

Now, the equation (10) will be described with reference to FIG. 5. In the xyY space, the maximum value of the brightness Y varies depending on the value of the chromaticity coordinate (x, y) on the xy chromaticity diagram. Specifically, the maximum value of the brightness corresponding to the point P and the maximum value of the brightness corresponding to the point Q are different. Accordingly, in this embodiment, the brightness of the color of the target pixel is converted from Y to $Y_1$ such that an increase rate in the brightness becomes equal to an increase rate of the maximum value of the brightness along with the conversion of the chromaticity coordinate of the color of the target pixel on the xy chromaticity diagram. For example, when the maximum value of the brightness corresponding to the point P is 3, and when the maximum value of the brightness corresponding to the point Q is 3.3, the brightness $Y_1$ after the conversion for the color of the target pixel is about 1.1 times higher than the brightness Y before the conversion.

After completing step S46, the process proceeds to step S50. As described above, if it is determined in step S20 that $l_{WP}$ is greater than $l_{WB}$, that is, if the input data chromaticity coordinate point is present outside the boundary line 43, conversion is performed to the value of the data in the xyY space such that the point Q at which "the proportion of the length of the line segment BP to the length of the line segment BH" and "the proportion of the length of the line segment BQ to the length of a line segment BD" become equal is the chromaticity coordinate point of the color of the target pixel after the conversion and such that "the proportion of the maximum value of the brightness at the point Q to the maximum value of the brightness at the point P" and "the proportion of the brightness $Y_1$ of the data after the conversion to the brightness Y represented by the inputted video signal" become equal.

In step S50, the three-dimensional matching processor 124 performs data conversion from the xyY colorimetric system to the XYZ colorimetric system based on the values $x_1$, $y_1$, and $Y_1$ of the data obtained either in step S32 through step S36 or in step S42 through step S46. The conversion from the xyY colorimetric system to the XYZ colorimetric system is performed based on following equations (11) to (13).

$$S = Y_1/y_1 \quad (11)$$

$$X_1 = x_1 \times S_1 \quad (12)$$

$$Z_1 = (1 - x_1 - y_1) \times S \quad (13)$$

It should be noted that the equations (11) to (13) are obtained as relations of "(X/x)=(Y/y)=(Z/z)" and "x+y+z=1" are established between the data in the XYZ colorimetric system and the data in the xyY colorimetric system.

As described above, when the tristimulus values $X_1$, $Y_1$, and $Z_1$ for the data in the XYZ colorimetric system are obtained, the conversion processing by the three-dimensional matching processor 124 ends.

4. Effects

According to this embodiment, depending on whether the chromaticity coordinate point (input data chromaticity coordinate point) of the color represented by the inputted video signal on the xy chromaticity diagram is within or outside the boundary line 43 that has been previously provided (on the xy chromaticity diagram), conversion processing of a different type is performed to the data of the relevant color. To be more specific, when the input data chromaticity coordinate point is outside the boundary line 43, the chromaticity coordinate point on the xy chromaticity diagram for the data after the conversion is determined such that "the positional relation among the boundary line 43, the outline of the color reproduction range 41 of the liquid crystal panel 14, and the chromaticity coordinate point of the data after the conversion" and "the positional relation among the boundary line 43, the outline of the color reproduction range 42 based on the HDTV standard, and the input data chromaticity coordinate point" become equal. Further, when the input data chromaticity coordinate point is outside the boundary line 43, the brightness of the data after the conversion in the xyY space is determined such that the proportion of the brightness of the data after the conversion to the brightness of the data before the conversion and the proportion of the maximum value of the brightness in the chromaticity coordinate point of the data after the conversion to the maximum value of the brightness in the input data chromaticity coordinate point become equal. In this manner, as for color whose input data chromaticity coordinate point is outside the boundary line 43, the conversion to the data values in the xyY space is performed such that saturation and brightness are increased, and the color after the conversion is displayed in the display portion of the liquid crystal panel 14. Further, when the input data chromaticity coordinate point is within the boundary line 43, the conversion to the data values in the xyY space is not performed, and colors accurate to the colors represented by the inputted video signal are displayed in the display portion of the liquid crystal panel 14. Accordingly, by defining the boundary line 43 so as to include so-called memory colors such as white color and flesh color, it is possible to display colors accurate to the colors represented by the inputted video signal for memory colors. As described above, it is possible to perform image display taking full advantage of the color reproduction performance of the panel without providing a viewer with a feeling of strangeness.

Further, according to this embodiment, conversion processing is performed to the tristimulus values X, Y, and Z of the data in the XYZ colorimetric system. In this case, in the XYZ colorimetric system unlike the RGB colorimetric system, the tristimulus values do not take negative values, and the tristimulus values are independent of a device. Accordingly, when it is desired to display color different from the color represented by the inputted video signal in the liquid crystal panel 14 as described above, it is possible to facilitate conversion processing to the data without requiring complicated arithmetic processing as compared to conversion processing to the data in the RGB colorimetric system.

5. Modified Examples

Modified examples of the embodiment described above will now be described.

5.1 Modified Example for Factor k Used in Conversion of Chromaticity Coordinate Value In the embodiment described above, the three-dimensional matching processor 124 uses k obtained by the equation (7), that is, k obtained by dividing $l_{BP}$ by $l_{BH}$, as the factor in the conversion (steps S42 and S44 of FIG. 3) of the chromaticity coordinate (x, y) on the xy chromaticity diagram. However, the present invention is not limited to this. For example, it is possible to employ a configuration in which a function of k obtained by the equation (7) is used as the factor. Hereinafter, the function of k is referred to as $k_1$ (first factor) for convenience.

According to this modified example, the three-dimensional matching processor 124 obtains the value of $x_1$ based on a following equation (14) instead of the equation (8) in step S42 described above, and obtains the value of $y_1$ based on a following equation (15) instead of the equation (9) in step S44 described above.

$$x_1 = x_2 + k_1 \times (x_3 - x_2) \tag{14}$$

$$y_1 = y_2 + k_1 \times (y_3 - y_2) \tag{15}$$

In this case, as for the factor $k_1$ included in the equation (14) and the equation (15), it is possible to employ a configuration in which it is obtained by a linear equation, and it is possible to employ a configuration in which it is obtained by a nonlinear equation. For example, if the configuration is such that $k_1$ is obtained by a following equation (16), the same conversion processing as that in the embodiment described above is performed.

$$k_1 = k \tag{16}$$

Further, for example, it is possible to employ a configuration in which $k_1$ is obtained by a nonlinear equation as shown by a following equation (17). Here, $\lambda$ is a positive factor that is determinable to be any value.

$$k_1 = 1 - e^{-k\lambda} \tag{17}$$

By employing the configuration in which $k_1$ is obtained by the nonlinear equation as described above, it is possible to perform image display taking full advantage of the color reproduction performance of the panel while reducing a feeling of strangeness provided for a viewer. It should be noted that, as the factor $k_1$ should be determined based on such as human visual features, it is desirable to determine it based on, not limited to the equation (16) and the equation (17), such as statistical data for visual quality of an image.

In the meantime, regarding the configuration in which $k_1$ as the function of k is used as the factor, it is possible to store $k_1$ in a previously prepared look-up table (first look-up table), and the factor $k_1$ can be acquired from the look-up table by the three-dimensional matching processor 124. This can be realized in a manner described below, for example. First, a number N of data pieces for the factor $k_1$ to be stored in the look-up table is determined. Then, an equation, as shown by a following equation (18) for example, is defined as an equation for obtaining a value of the factor $k_1$. It should be noted that i is an index used when referring the look-up table, and is an integer that is not less than 0 and smaller than N.

$$k_1[i] = 1 - e^{-i\lambda} \tag{18}$$

Next, in the equation (18), after a value for $\lambda$ is determined, an integer not less than 0 and smaller than N is sequentially substituted into the index i. With this, assuming that the number N of data pieces for the factor $k_1$ is "32", for example, a look-up table as shown in FIG. 6, for example, including 32 data pieces as factors $k_1[0]$-$k_1[31]$ is generated. It is preferable to store the look-up table thus generated into the image processing device 12 and to employ such a configuration that the three-dimensional matching processor 124 can refer the look-up table.

The index i used for referring the look-up table so that the three-dimensional matching processor 124 acquires the value of the factor $k_1$ can be acquired, for example, by making a product of "k obtained in step S40 described above" and "the number N of data pieces for the factor $k_1$" to be an integer (e.g., a value obtained by rounding down to the nearest whole number). For example, if the value of k obtained in step S40 is "0.1", and if the number N of data pieces for the factor $k_1$ is "32", "3" that is obtained by rounding down "3.2" as a product of "0.1" and "32" to the nearest whole number is taken as the index i that is used by the three-dimensional matching processor 124 when referring the look-up table. However, when the value of k is "1", a product of "1" and "32" is "32" even though a maximum value of the index i is "31". Therefore, "31" is taken as the index i that is used by the three-dimensional matching processor 124 when referring the look-up table.

As described above, by providing the look-up table that stores values for the factor $k_1$, it is possible to eliminate the necessity for the three-dimensional matching processor 124 to perform the arithmetic processing based on the nonlinear equation as expressed by the equation (17) during operation of the display apparatus 10, and thus to facilitate the implementation.

5.2 Modified Example for Brightness Conversion

In the embodiment described above, the brightness conversion in the xyY space is performed based on the equation (10), that is, the brightness of the color of the target pixel is converted from Y to $Y_1$ such that the increase rate in the brightness becomes equal to the increase rate of the maximum value of the brightness along with the conversion of the chromaticity coordinate of the color of the target pixel on the xy chromaticity diagram. However, the present invention is not limited to this. For example, it is possible to employ a configuration in which the conversion from Y to $Y_1$ is performed based on a following equation (19) instead of the equation (10). It should be noted that a factor $k_2$ (second factor) included in the following equation (19) is a function of k obtained by the equation (7).

[Equation 6]

$$Y_1 = \left[(1-K_2) + \frac{Y_{panel\_max}(x_1, y_1)}{Y_{HDTV\_max}(x, y)} \times K_2\right] \times Y$$

Regarding the equation (19), as for factor $k_2$, similarly to the above-described factor $k_1$, it is possible to employ a configuration in which it is obtained by a linear equation, and it is possible to employ a configuration in which it is obtained by a nonlinear equation. For example, it is possible to employ a configuration in which $k_2$ is obtained by a following equation (20).

$$k_2 = k \quad (20)$$

In the meantime, as can be seen from FIG. 4 and the equation (7), the closer the input data chromaticity coordinate point is to the boundary line 43, the closer the value of k is to "0", and the closer the input data chromaticity coordinate point is to the outline of the color reproduction range 42 based on the HDTV standard, the closer the value of k is to "1". Accordingly, when the configuration is such that the factor $k_2$ is obtained by the equation (20), the closer the input data chromaticity coordinate point is to the boundary line 43, the closer the value of the factor $k_2$ is to "0", and the closer the input data chromaticity coordinate point is to the outline of the color reproduction range 42 based on the HDTV standard, the closer the value of factor $k_2$ is to "1". Therefore, as the input data chromaticity coordinate point is closer to the boundary line 43, the conversion from Y to $Y_1$ is performed by giving a heavier weight to the value of Y which is the brightness in the xyY space based on the inputted video signal. By contrast, as the input data chromaticity coordinate point is closer to the outline of the color reproduction range 42 based on the HDTV standard, the conversion from Y to $Y_1$ is performed by giving a heavier weight to the increase rate of the maximum value of the brightness along with the conversion of the chromaticity coordinate. By employing the configuration in which the conversion from Y to $Y_1$ is performed based on the equation (19) as described above, the brightness conversion for colors whose chromaticity coordinate is outside the boundary line 43 on the xy chromaticity diagram is performed with further considering human visual features. With this, it is possible to perform image display using colors of brightness higher than the maximum brightness obtained by the inputted video signal without providing a viewer of an image with a feeling of strangeness.

Further, similarly to the above-described factor $k_1$, it is possible to employ a configuration in which the factor $k_2$ is obtained by a nonlinear equation as shown by a following equation (21). Here, γ is a positive factor that is determinable to be any value.

$$k_2 = 1 - e^{-k\gamma} \quad (21)$$

Moreover, similarly to the factor $k_1$, it is possible to employ a configuration in which a look-up table (second look-up table) including data of the factor $k_2$ is stored in the image processing device 12 and the three-dimensional matching processor 124 acquires the factor $k_2$ from the look-up table.

5.3 Modified Example for Boundary Line

Figure 7:
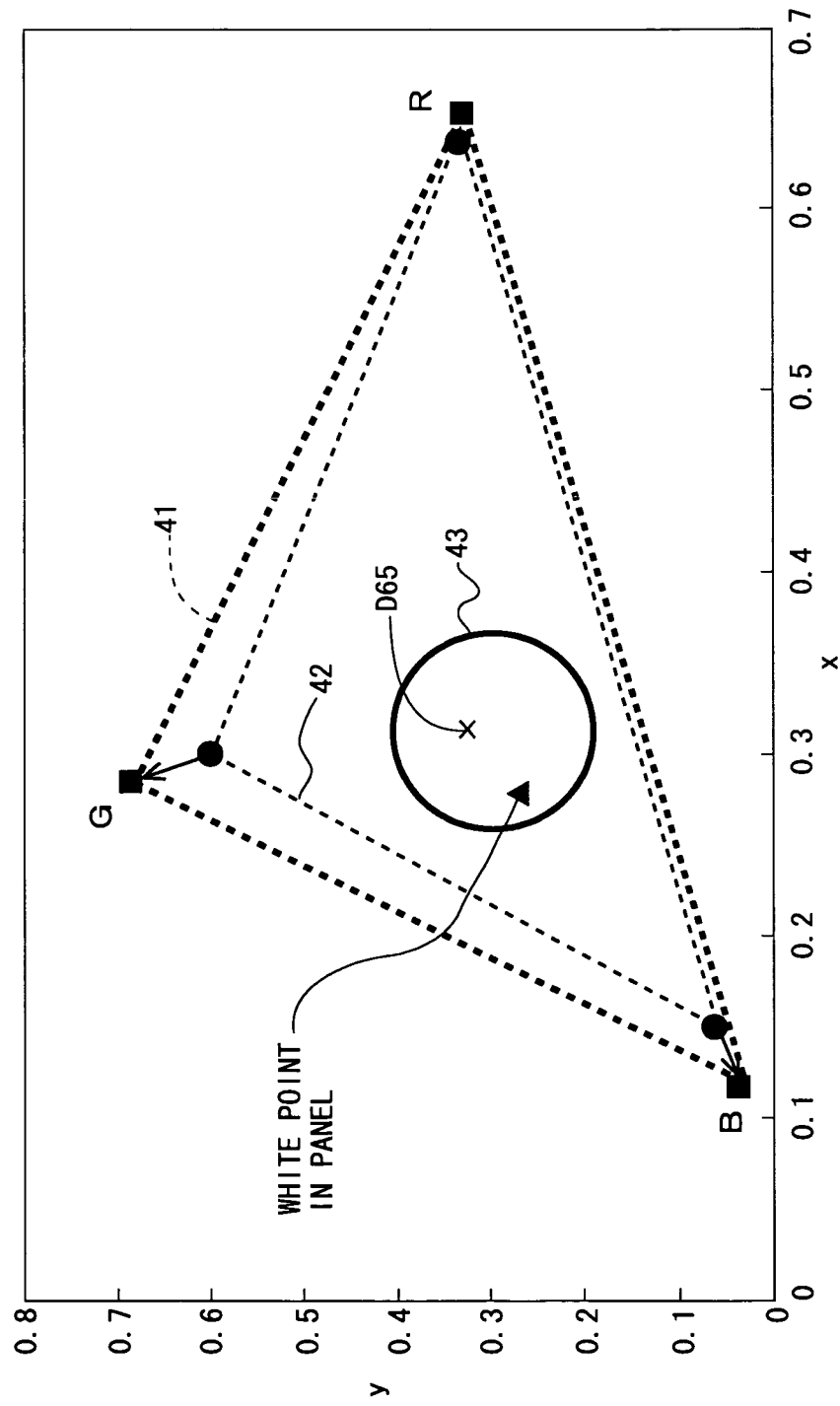
FIG. 7 is an xy chromaticity diagram illustrating an example in which a boundary line is circular in a modified example according to the embodiment.

In the embodiment described above, the shape of the boundary line 43 on the xy chromaticity diagram defines an enneagon shape (see FIG. 2). However, the present invention is not limited to this. The shape of the boundary line 43 can be a polygon other than an enneagon, or can be circular as shown in FIG. 7 for example, as long as it is possible to express the shape by an equation on an xy plane. It should be noted that, as the visual quality of an image on a screen depends on a viewer's preference, it is preferable to acquire a large amount of statistical data for visual quality of an image, and to determine the boundary line 43 based on the acquired statistical data.

Further, in the embodiments described above, the configuration is such that the chromaticity coordinates of memory colors and D65 (reference white color) are included within the boundary line 43. However, the present invention is not limited to this. For example, the configuration may be such that chromaticity coordinates of colors that should be displayed accurately to the inputted video signal other than memory colors and the chromaticity coordinate of D65 are included within the boundary line 43, or the configuration may be such that the chromaticity coordinate of a reference white color (such as D93) other than D65 is included within the boundary line 43.

Moreover, the configuration may be such that the process from step S40 to step S46 is performed for all the colors represented by the inputted video signal, without providing the boundary line 43 on the xy chromaticity diagram, to convert the chromaticity coordinate point on the xy chromaticity diagram to be closer to the outline of the color reproduction range of the liquid crystal panel 14 (that is, to increase the saturation), as well as to increase the brightness in the xyY space.

5.4 Modified Example for Inputted Video Signal

In the embodiments described above, the description is made using an example in which the RGB signal in the HDTV standard is supplied to the display apparatus 10 from an external. However, the present invention is not limited to this. For example, the present invention can be applied to a configuration in which an RGB signal in a standard other than the HDTV standard, such as the EBU (European Broadcasting Union) standard and the NTSC (National Television System Committee) standard, is supplied to the display apparatus 10 from the external.

| DESCRIPTION OF REFERENCE NUMERALS | |
|---|---|
| 10: | Display Apparatus |
| 12: | Image Processing Device |
| 14: | Liquid Crystal Panel |
| 20: | Signal Source |
| 41: | (Outline of) Color Reproduction Range of Liquid Crystal Panel |
| 42: | (Outline of) Color Reproduction Range Based on HDTV Standard |
| 43: | Boundary Line |
| 122: | First Color Space Converter |
| 124: | Three-Dimensional Matching Processor |
| 126: | Second Color Space Converter |

The invention claimed is:

1. An image processing device, comprising:
a first color space converter configured to convert externally supplied image data in an RGB colorimetric system into first XYZ data which is image data in an XYZ colorimetric system;
an XYZ data converter configured to generate second XYZ data which is image data in the XYZ colorimetric system by performing predetermined conversion processing to values of X, Y, and Z as tristimulus values that constitute the first XYZ data; and a second color space converter configured to convert the second XYZ data into image data in the RGB colorimetric system, wherein the XYZ data converter is configured to perform the conversion processing to the values of X, Y, and Z such that a color reproduction range obtained by the second XYZ data is wider than a color reproduction range obtained by the first XYZ data and wherein when performing the conversion processing to data of each pixel included in the first XYZ data, on an xy chromaticity diagram, the XYZ data converter obtains a first coordinate, a second coordinate, and a third coordinate, the first coordinate being a chromaticity coordinate for data of the corresponding pixel, the second coordinate being a chromaticity coordinate of an intersection point between a straight line for conversion and a line defining the color reproduction range obtained by the first XYZ data, the third coordinate being a chromaticity coordinate of an intersection point between the straight line for conversion and a line defining the color reproduction range obtained by the second XYZ data, the straight line for conversion passing through a predetermined reference coordinate and the first coordinate, and obtains a value of a fourth coordinate such that a proportion of a distance between the reference coordinate and the first coordinate to a distance between the reference coordinate and the second coordinate becomes equal to a proportion of a distance between the reference coordinate and the fourth coordinate to a distance between the reference coordinate and the third coordinate and the fourth coordinate corresponds to a chromaticity coordinate on the straight line for conversion when a chromaticity coordinate for data after the conversion processing to the data of the corresponding pixel is defined as the fourth coordinate.

2. The image processing device according to claim 1, wherein the XYZ data converter obtains, when performing the conversion processing to data of each pixel included in the first XYZ data, a value of brightness for data of each pixel to be included in the second XYZ data such that a proportion of a maximum value of brightness at the fourth coordinate to a maximum value of brightness at the first coordinate becomes equal to a proportion of brightness for data after the conversion processing is performed to the data of the corresponding pixel included in the first XYZ data to brightness for the data of the corresponding pixel included in the first XYZ data.

3. The image processing device according to claim 1, wherein, on the xy chromaticity diagram, the XYZ data converter takes, as the reference coordinate, a chromaticity coordinate of an intersection point between a boundary line and the straight line for conversion, and performs the conversion processing to data of each pixel included in the first XYZ data only when the first coordinate is outside the boundary line, the boundary line including at least three points and defining a closed region.

4. The image processing device according to claim 3, wherein the boundary line is defined so as to include therein a chromaticity coordinate for D65 which is a standard light source.

5. The image processing device according to claim 3, wherein the boundary line is defined so as to include therein chromaticity coordinates of memory color including at least white color and flesh color.

6. A display apparatus having a display panel to display an image, the display apparatus comprising:

the image processing device according to claim 1, wherein the display panel displays the image based on data in an RGB colorimetric system generated by the second color space converter.

7. A display apparatus having a display panel to display an image, the display apparatus comprising:

the image processing device according to claim 2, wherein the display panel displays the image based on data in an RGB colorimetric system generated by the second color space converter.

8. A display apparatus having a display panel to display an image, the display apparatus comprising:

the image processing device according to claim 3, wherein the display panel displays the image based on data in an RGB colorimetric system generated by the second color space converter.

9. A display apparatus having a display panel to display an image, the display apparatus comprising:

the image processing device according to claim 4, wherein the display panel displays the image based on data in an RGB colorimetric system generated by the second color space converter.

10. A display apparatus having a display panel to display an image, the display apparatus comprising:

the image processing device according to claim 5, wherein the display panel displays the image based on data in an RGB colorimetric system generated by the second color space converter.

11. An image processing device, comprising:

a first color space converter configured to convert externally supplied image data in an RGB colorimetric system into first XYZ data which is image data in an XYZ colorimetric system;

an XYZ data converter configured to generate second XYZ data which is image data in the XYZ colorimetric system by performing predetermined conversion processing to values of X, Y, and Z as tristimulus values that constitute the first XYZ data; and a second color space converter configured to convert the second XYZ data into image data in the RGB colorimetric system, wherein the XYZ data converter is configured to perform the conversion processing to the values of X, Y, and Z such that a color reproduction range obtained by the second XYZ data is wider than a color reproduction range obtained by the first XYZ data and wherein when performing the conversion processing to data of each pixel included in the first XYZ data, on an xy chromaticity diagram, the XYZ data converter obtains a first coordinate, a second coordinate, and a third coordinate, the first coordinate being a chromaticity coordinate for data of the corresponding pixel, the second coordinate being a chromaticity coordinate of an intersection point between a straight line for conversion and a line defining the color reproduction range obtained by the first XYZ data, the third coordinate being a chromaticity coordinate of an intersection point between the straight line for conversion and a line defining the color reproduction range obtained by the second XYZ data, the straight line for conversion passing through a predetermined reference coordinate and the first coordinate, and takes, as a fourth coordinate, a chromaticity coordinate of a point that is on the straight line for conversion and closer to the third coordinate from the reference coordinate by a distance obtained by multiplying a first factor by a distance between the reference coordinate and the third coordinate when a chromaticity coordinate for data after the conversion processing to the data of the corresponding pixel is defined as the fourth coordinate, the first factor being represented by a function of a basic factor obtained by dividing a distance between the reference coordinate and the first coordinate by a distance between the reference coordinate and the second coordinate.

12. The image processing device according to claim 11, wherein
the XYZ data converter obtains the first factor by an equation:

$$k_1 = 1 - e^{-k\lambda}$$

wherein, $k_1$ is the first factor, k is the basic factor, e is a base of natural logarithm, and $\lambda$ is a positive factor that is determinable to be any value.

13. The image processing device according to claim 11, further comprising a first look-up table that previously stores a plurality of values of the first factor each in association with a predetermined index, wherein
the XYZ data converter acquires a value of the first factor from the first look-up table by using an index obtained based on the basic factor.

14. The image processing device according to claim 11, wherein
the XYZ data converter obtains, when performing the conversion processing to data of each pixel included in the first XYZ data, a value of brightness for data of each pixel to be included in the second XYZ data by using a second factor represented by a function of the basic factor and based on an equation:

$$Y_1 = ((1-k_2) + (Y_a \times k_2)) \times Y$$

wherein, $Y_1$ is the brightness for the data of the corresponding pixel to be included in the second XYZ data, Y is the brightness for the data of the corresponding pixel included in the first XYZ data, $k_2$ is the second factor, and $Y_a$ is a value obtained by dividing a maximum value of brightness at the fourth coordinate by a maximum value of brightness at the first coordinate.

15. The image processing device according to claim 14, wherein
the XYZ data converter obtains the second factor based on an equation:

$$k_2 = 1 - e^{-k\gamma}$$

wherein, $k_2$ is the second factor, k is the basic factor, e is a base of natural logarithm, and $\gamma$ is a positive factor that is determinable to be any value.

16. The image processing device according to claim 14, further comprising a second look-up table that previously stores a plurality of values of the second factor each in association with a predetermined index, wherein
the XYZ data converter acquires a value of the second factor from the second look-up table by using an index obtained based on the basic factor.

17. A display apparatus having a display panel to display an image, the display apparatus comprising:
the image processing device according to claim 11, wherein
the display panel displays the image based on data in an RGB colorimetric system generated by the second color space converter.

18. A display apparatus having a display panel to display an image, the display apparatus comprising:
the image processing device according to claim 12, wherein
the display panel displays the image based on data in an RGB colorimetric system generated by the second color space converter.

19. A display apparatus having a display panel to display an image, the display apparatus comprising:
the image processing device according to claim 13, wherein
the display panel displays the image based on data in an RGB colorimetric system generated by the second color space converter.

20. A display apparatus having a display panel to display an image, the display apparatus comprising:
the image processing device according to claim 14, wherein
the display panel displays the image based on data in an RGB colorimetric system generated by the second color space converter.

21. A display apparatus having a display panel to display an image, the display apparatus comprising:
the image processing device according to claim 15, wherein
the display panel displays the image based on data in an RGB colorimetric system generated by the second color space converter.

22. A display apparatus having a display panel to display an image, the display apparatus comprising:
the image processing device according to claim 16, wherein
the display panel displays the image based on data in an RGB colorimetric system generated by the second color space converter.

23. An image processing method, comprising:
a first color space converting step of converting image data in an RGB colorimetric system into first XYZ data which is image data in an XYZ colorimetric system;
an XYZ data converting step of generating second XYZ data which is image data in the XYZ colorimetric system by performing predetermined conversion processing to values of X, Y, and Z as tristimulus values that constitute the first XYZ data; and
a second color space converting step of converting the second XYZ data into image data in the RGB colorimetric system, wherein
in the XYZ data converting step, the conversion processing is performed to the values of X, Y, and Z such that a color reproduction range obtained by the second XYZ data is wider than a color reproduction range obtained by the first XYZ data and wherein
in the XYZ data converting step, when the conversion processing is performed to data of each pixel included in the first XYZ data, on an xy chromaticity diagram,
a first coordinate, a second coordinate, and a third coordinate are obtained, the first coordinate being a chromaticity coordinate for data of the corresponding pixel, the second coordinate being a chromaticity coordinate of an intersection point between a straight line for conversion and a line defining the color reproduction range obtained by the first XYZ data, the third coordinate being a chromaticity coordinate of an intersection point between the straight line for conversion and a line defining the color reproduction range obtained by the second XYZ data, the straight line for conversion passing through a predetermined reference coordinate and the first coordinate, and a value of a fourth coordinate is obtained such that a proportion of a distance between the reference coordinate and the first coordinate to a distance between the reference coordinate and the second coordinate becomes equal to a proportion of a distance between the reference coordinate and the fourth coordinate to a distance between the reference coordinate and the third coordinate and the fourth coordinate corresponds to a chromaticity coordinate on the straight line for conversion when a chromaticity coordinate for data after the conversion processing to the data of the corresponding pixel is defined as the fourth coordinate.

24. The image processing method according to claim 23, wherein in the XYZ data converting step, when the conversion processing is performed to data of each pixel included in the first XYZ data, a value of brightness for data of each pixel to be included in the second XYZ data is obtained such that a proportion of a maximum value of brightness at the fourth coordinate to a maximum value of brightness at the first coordinate becomes equal to a proportion of brightness for data after the conversion processing is performed to the data of the corresponding pixel included in the first XYZ data to brightness for the data of the corresponding pixel included in the first XYZ data.

25. The image processing method according to claim 23, wherein in the XYZ data converting step, on the xy chromaticity diagram, a chromaticity coordinate of an intersection point between a boundary line and the straight line for conversion is taken as the reference coordinate, and the conversion processing is performed to data of each pixel included in the first XYZ data only when the first coordinate is outside the boundary line, the boundary line including at least three points and defining a closed region.

26. The image processing method according to claim 25, wherein the boundary line is defined so as to include therein a chromaticity coordinate for D65 which is a standard light source.

27. The image processing method according to claim 25, wherein the boundary line is defined so as to include therein chromaticity coordinates of memory color including at least white color and flesh color.

28. An image processing method, comprising:

a first color space converting step of converting image data in an RGB colorimetric system into first XYZ data which is image data in an XYZ colorimetric system;

an XYZ data converting step of generating second XYZ data which is image data in the XYZ colorimetric system by performing predetermined conversion processing to values of X, Y, and Z as tristimulus values that constitute the first XYZ data; and a second color space converting step of converting the second XYZ data into image data in the RGB colorimetric system, wherein in the XYZ data converting step, the conversion processing is performed to the values of X, Y, and Z such that a color reproduction range obtained by the second XYZ data is wider than a color reproduction range obtained by the first XYZ data and wherein in the XYZ data converting step, when the conversion processing is performed to data of each pixel included in the first XYZ data, on an xy chromaticity diagram, a first coordinate, a second coordinate, and a third coordinate are obtained, the first coordinate being a chromaticity coordinate for data of the corresponding pixel, the second coordinate being a chromaticity coordinate of an intersection point between a straight line for conversion and a line defining the color reproduction range obtained by the first XYZ data, the third coordinate being a chromaticity coordinate of an intersection point between the straight line for conversion and a line defining the color reproduction range obtained by the second XYZ data, the straight line for conversion passing through a predetermined reference coordinate and the first coordinate, and a chromaticity coordinate of a point that is on the straight line for conversion and closer to the third coordinate from the reference coordinate by a distance obtained by multiplying a first factor by a distance between the reference coordinate and the third coordinate is taken as a fourth coordinate when a chromaticity coordinate for data after the conversion processing to the data of the corresponding pixel is defined as the fourth coordinate, the first factor being represented by a function of a basic factor obtained by dividing a distance between the reference coordinate and the first coordinate by a distance between the reference coordinate and the second coordinate.

29. The image processing method according to claim 28, wherein in the XYZ data converting step, the first factor is obtained by an equation:

$$k_1 = 1 - e^{-k\lambda}$$

wherein, $k_1$ is the first factor, k is the basic factor, e is a base of natural logarithm, and $\lambda$ is a positive factor that is determinable to be any value.

30. The image processing method according to claim 28, wherein in the XYZ data converting step, a value of the first factor is acquired from a first look-up table by using an index obtained based on the basic factor, the first look-up table previously storing a plurality of values of the first factor each in association with a predetermined index.

31. The image processing method according to claim 28, wherein in the XYZ data converting step, when the conversion processing is performed to data of each pixel included in the first XYZ data, a value of brightness for data of each pixel to be included in the second XYZ data is obtained by using a second factor represented by a function of the basic factor and based on an equation:

$$Y_1 = ((1-k_2) + (Y_a \times k_2)) \times Y$$

wherein, $Y_1$ is the brightness for the data of the corresponding pixel to be included in the second XYZ data, Y is the brightness for the data of the corresponding pixel included in the first XYZ data, $k_2$ is the second factor, and $Y_a$ is a value obtained by dividing a maximum value of brightness at the fourth coordinate by a maximum value of brightness at the first coordinate.

32. The image processing method according to claim 31, wherein in the XYZ data converting step, the second factor is obtained based on an equation:

$$k_2 = 1 - e^{-k^\gamma}$$

wherein, $k_2$ is the second factor, k is the basic factor, e is a base of natural logarithm, and $\gamma$ is a positive factor that is determinable to be any value.

33. The image processing method according to claim 31, wherein in the XYZ data converting step, a value of the second factor is acquired from a second look-up table by using an index obtained based on the basic factor, the second look-up table previously storing a plurality of values of the second factor each in association with a predetermined index.

* * * * *